(12) United States Patent
Johnson (10) Patent No.: US 9,953,683 B1
(45) Date of Patent: Apr. 24, 2018

(54) DIE-CUT GASKET MANUFACTURING

(71) Applicant: Microsoft Technology Licensing, LLC, Redmond, WA (US)

(72) Inventor: David B. Johnson, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/484,738

(22) Filed: Apr. 11, 2017

(51) Int. Cl.
  *G11B 33/14* (2006.01)
  *G11B 33/02* (2006.01)
  *B26D 5/00* (2006.01)
  *B26F 1/38* (2006.01)

(52) U.S. Cl.
  CPC .......... *G11B 33/022* (2013.01); *B26D 5/005* (2013.01); *B26F 1/38* (2013.01)

(58) Field of Classification Search
  None
  See application file for complete search history.

(56) References Cited

U.S. PATENT DOCUMENTS

| | | | |
|---|---|---|---|
| 5,712,449 A | 1/1998 | Miska et al. | |
| 6,320,122 B1* | 11/2001 | Dickey | H05K 9/0018 174/359 |
| 6,621,000 B2* | 9/2003 | Jensen | G06F 1/182 174/355 |
| 6,784,363 B2* | 8/2004 | Jones | H05K 9/0015 174/351 |
| 7,763,810 B2 | 7/2010 | van Haaster | |
| 7,815,998 B2* | 10/2010 | Simpson | B29C 44/12 264/429 |
| 7,875,345 B1* | 1/2011 | Simpson | B29C 44/12 264/429 |
| 8,884,168 B2* | 11/2014 | Cook | H05K 9/0015 174/356 |
| 2002/0005617 A1 | 1/2002 | Sosnowski | |
| 2003/0209355 A1 | 11/2003 | Jensen et al. | |
| 2004/0094904 A1 | 5/2004 | Grant | |

(Continued)

FOREIGN PATENT DOCUMENTS

| | | | |
|---|---|---|---|
| JP | 11121966 A | * | 4/1999 |
| JP | 11145670 A | * | 5/1999 |

(Continued)

OTHER PUBLICATIONS

"Fabric Over Foam Gasket", Soft-Shield 5000, Feb. 27, 2016, 7 pages. http://web.archive.org/web/*/http:/www.jhcss.com.au/products-1/emi-shielding/fabric-over-foam-gasket-148053906.

(Continued)

*Primary Examiner* — William J Klimowicz
(74) *Attorney, Agent, or Firm* — International IP Law Group, PLLC (57) ABSTRACT

A method for manufacturing gaskets is described herein that includes cutting at least one hole in a first material, wherein the at least one hole corresponds to a first geometric shape. The method can also include wrapping the first material in a conductive material to produce a conductive material wrapped gasket. Additionally, the method can include producing a die-cut gasket by cutting a pattern from the conductive material wrapped gasket, the pattern to be cut from portions of the conductive material wrapped gasket corresponding to the at least one hole, wherein the pattern is to be based on a second geometric shape.

17 Claims, 7 Drawing Sheets

(56) References Cited

U.S. PATENT DOCUMENTS

| | | | |
|---|---|---|---|
| 2006/0080825 A1* | 4/2006 | Pille | H05K 5/0243 174/381 |
| 2006/0081389 A1* | 4/2006 | Pille | H05K 5/0243 174/381 |
| 2006/0209523 A1* | 9/2006 | Cochrane | H05K 9/0073 361/818 |
| 2006/0260838 A1* | 11/2006 | Ariel | H05K 9/0015 174/350 |
| 2008/0311378 A1* | 12/2008 | Simpson | C08J 9/0066 428/319.1 |
| 2009/0226696 A1* | 9/2009 | Simpson | C08J 9/0066 428/304.4 |
| 2011/0006267 A1 | 1/2011 | Simpson et al. | |
| 2011/0155945 A1* | 6/2011 | Soong | C08J 9/0066 252/62.54 |
| 2012/0090886 A1* | 4/2012 | Park | H05K 3/3431 174/358 |
| 2013/0335285 A1 | 12/2013 | Tarkington et al. | |
| 2014/0216806 A1* | 8/2014 | Poulsen | H05K 9/0015 174/351 |
| 2016/0262291 A1 | 9/2016 | Tucker et al. | |
| 2017/0034960 A1* | 2/2017 | Ham | H05K 9/0015 |

FOREIGN PATENT DOCUMENTS

| | | | |
|---|---|---|---|
| JP | 2001007583 A | * | 1/2001 |
| JP | 2002329993 A | * | 11/2002 |
| JP | 2006100521 A | * | 4/2006 |
| KR | 0979272 B1 | * | 10/2010 |
| WO | 2003071846 A1 | | 8/2003 |

OTHER PUBLICATIONS

"EMI Shields & Gaskets", Retrieved on: Jan. 25, 2017, 2 pages. https://www.lairdtech.com/products/4529-107mmw-x-118mmh.

"Conductive Gasket", Coatex Industries, Retrieved Date: Jan. 25, 2017, 4 pages. http://www.coatexindustries.co.in/conductive-gasket.html.

"Elastomer gaskets clad in Satmet fabric", Retrieved on: Jan. 25, 2017, 6 pages http://www.solianiemc.com/assets/Specifiche/SOL-04-Elastomer-gaskets-Specification.pdf.

* cited by examiner

DIE-CUT GASKET MANUFACTURING

BACKGROUND

Electronic devices can include any suitable number of electronic components within an enclosure. In some examples, the electronic components can reside within an opening of an enclosure such that a portion of the electronic component is inside the enclosure and a portion of the electronic component is exposed to the exterior of the enclosure. In some examples, the electronic components can include compact disc read only memory (CD-ROM) drives, hard drives, and the like. To prevent electromagnetic interference from propagating outside of the enclosure, gaskets can be placed in openings between the electronic components and a chassis of the enclosure.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, an electronic device includes an enclosure comprising an electronic component separated from a chassis of the enclosure by a die-cut gasket. The die-cut gasket can include at least one hole cut in a first material, wherein the at least one hole corresponds to a first geometric shape. Additionally, the die-cut gasket can include a conductive material wrapped around the first material and a pattern cut from the conductive material and the first material, the pattern to be cut from portions corresponding to the at least one hole, wherein the pattern is to be based on a second geometric shape.

In another embodiment described herein, an electronic device can include an enclosure comprising an electronic component separated from a chassis of the enclosure by a die-cut gasket. The die-cut gasket can include a pattern cut from a conductive foam segment, the pattern to be cut from portions of the conductive foam segment that are to be stretched proximate an opening in the chassis, wherein the pattern is to be based on a geometric shape.

Another embodiment described herein includes a method for manufacturing gaskets that includes cutting at least one hole in a first material, wherein the at least one hole corresponds to a first geometric shape. The method can also include wrapping the first material in a conductive material to produce a conductive material wrapped gasket and producing a die-cut gasket by cutting a pattern from the conductive material wrapped gasket, the pattern to be cut from portions of the conductive material wrapped gasket corresponding to the at least one hole, wherein the pattern is to be based on a second geometric shape.

In one embodiment, a die-cut gasket can include at least one hole cut in a first material, wherein the at least one hole corresponds to a first geometric shape. The die-cut gasket can also include a conductive material wrapped around the first material and a pattern cut from the conductive material and the first material, the pattern to be cut from portions corresponding to the at least one hole, wherein the pattern is to be based on a second geometric shape.

In another embodiment described herein, a method for manufacturing gaskets includes determining a pattern to produce a stretchable die-cut gasket based on an opening in a chassis of an electronic device enclosure. The method also includes producing the stretchable die-cut gasket by cutting the pattern from a conductive foam segment, the pattern to be cut from portions of the conductive foam segment that are to be stretched proximate the opening in the chassis, wherein the pattern is to be based on a geometric shape.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Conductive fabric-over-foam gaskets can be used to electromagnetically seal a metal enclosure, or to ground certain metal parts, which can minimize electromagnetic interference (EMI) or reduce self-interference with a device's radio. Rather than sealing a metal enclosure with a long length gasket, techniques described herein provide a stretchable die-cut gasket.

In some embodiments, manufacturing a die-cut gasket can include cutting at least one hole in a first material, wherein the at least one hole corresponds to a first geometric shape. For examples, a process of manufacturing a die-cut gasket can include cutting a circle, or any other suitable shape, into a material at any suitable location. The manufacturing process can also include wrapping the first material in a conductive material to produce a conductive material wrapped gasket. Furthermore, the manufacturing process can include producing a die-cut gasket by cutting a pattern from the conductive material wrapped gasket, wherein the pattern can be cut from portions of the conductive material wrapped gasket corresponding to the at least one hole. In some embodiments, the pattern can be based on a second geometric shape. For example, a triangular pattern or any other suitable pattern may be cut away from a portion of the conductive material wrapped gasket to enable the die-cut gasket to stretch.

Techniques described herein can produce a die-cut gasket that is stretchable around electronic components of an enclosure. Accordingly, the die-cut gasket can prevent electromagnetic radiation from propagating outside of an enclosure, while reducing an amount of material used to manufacture the gasket.

Figure 7:
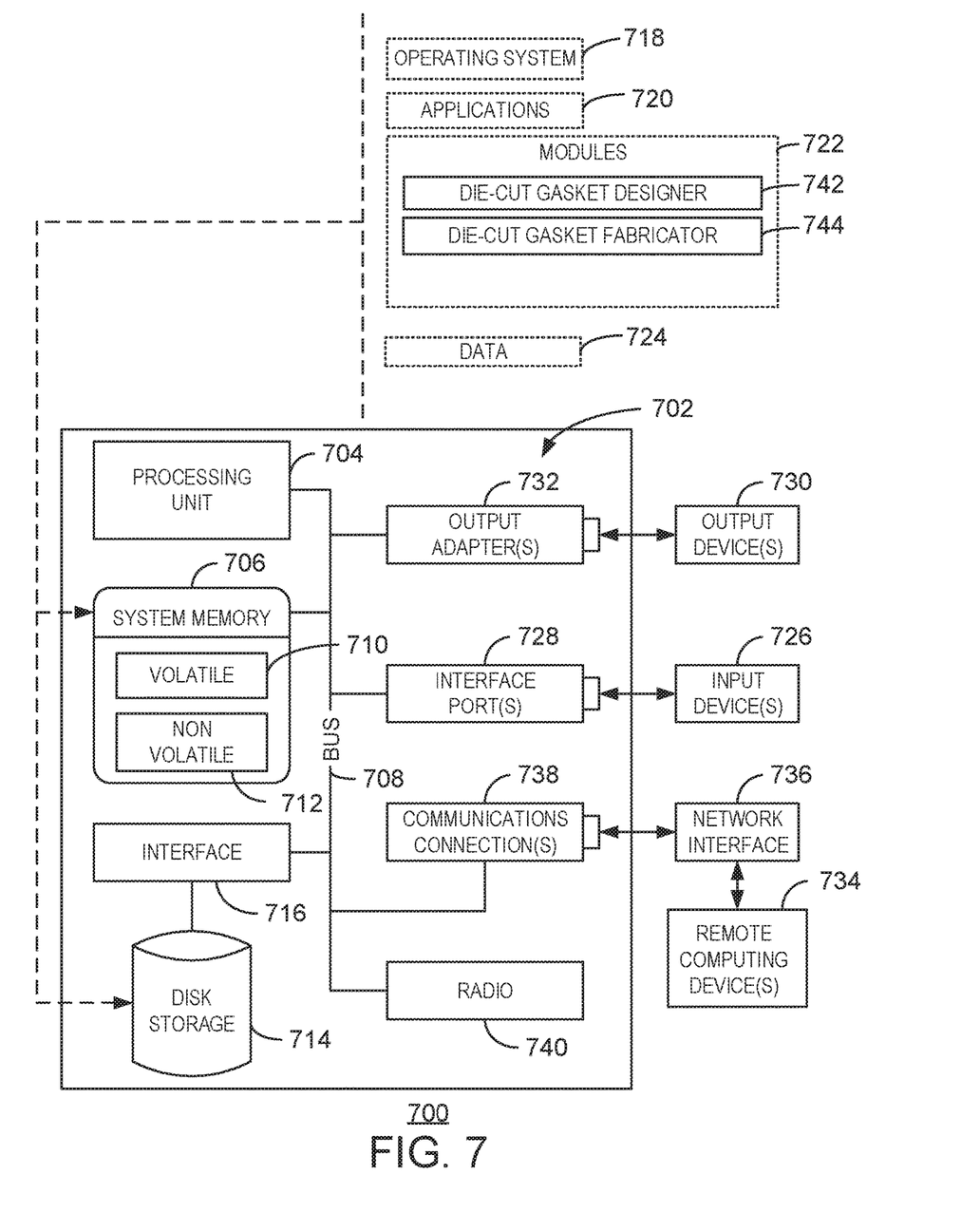
FIG. 7 is a block diagram of an example computing system that can design a die-cut gasket.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 7 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Figure 1:
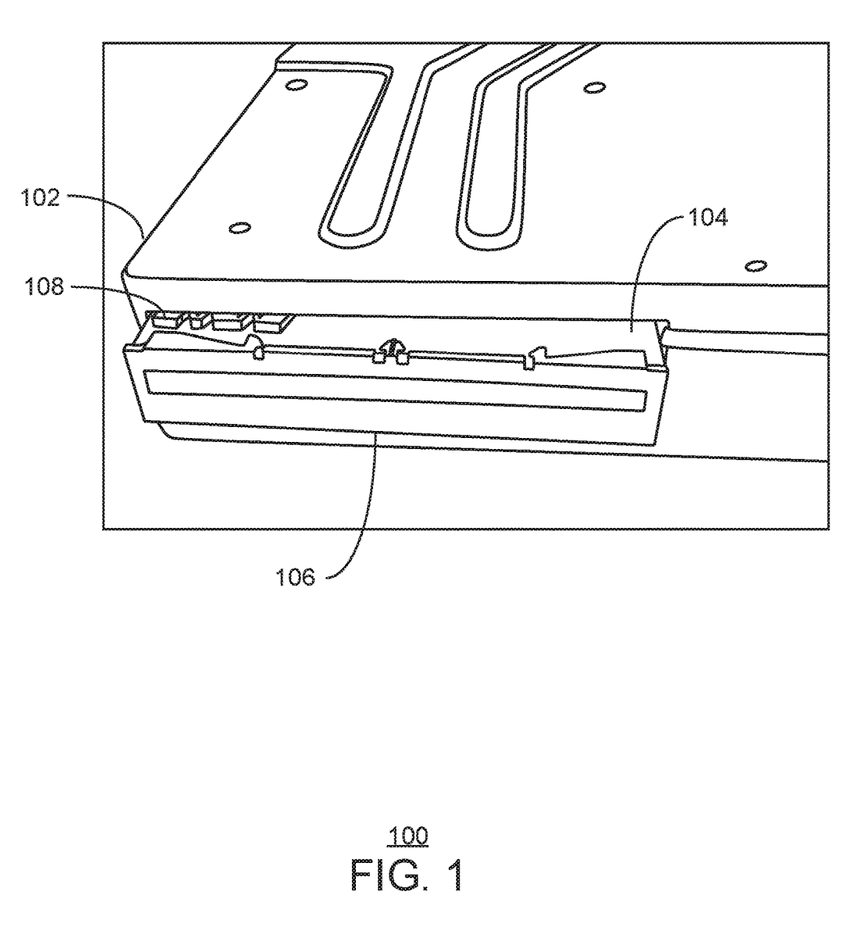
FIG. 1 is a block diagram of a front perspective of a computing system that includes a die-cut gasket.

FIG. 1 is a block diagram of a front perspective of a computing system that includes a die-cut gasket. The system 100 can include an enclosure 102 with an opening 104. In some examples, the enclosure 102 can be manufactured from any suitable metal. An electrical component can reside in the opening 104 of the enclosure 102. For example, the opening 104 can include an optical disk drive 106 such as a compact disk ROM device (CD-ROM), CD recordable drive (CD-R Drive), CD rewritable drive (CD-RW Drive) or a digital versatile disk ROM drive (DVD-ROM), among others. In some embodiments, a die-cut gasket 108 can reside in the opening 104 of the enclosure 102 between the optical disk drive 106 and the enclosure 102 itself. The die-cut gasket 108 can be stretchable to fill the gap between the optical disk drive 106 and the enclosure 102. In FIG. 1, the die-cut gasket 108 is illustrated in a non-stretched state.

In some examples, the die-cut gasket 108 can prevent electromagnetic interference from propagating outside of the enclosure 102. For example, any suitable electrical components, such as radios, or integrated circuits, among others, within the enclosure may generate the electromagnetic interference. The electromagnetic interference can affect circuitry by electromagnetic induction, electrostatic coupling, or conduction, among others. The electromagnetic interference can cause unexpected behavior in circuits such as by causing errors, degrading performance, and the like.

In some embodiments, the system 100 can include any suitable number of openings 104 within the enclosure 102. Additionally, the system 100 can include any suitable number of die-cut gaskets 108 in each opening to prevent electromagnetic radiation propagating around any suitable optical drive 106, among other components.

Figure 2:
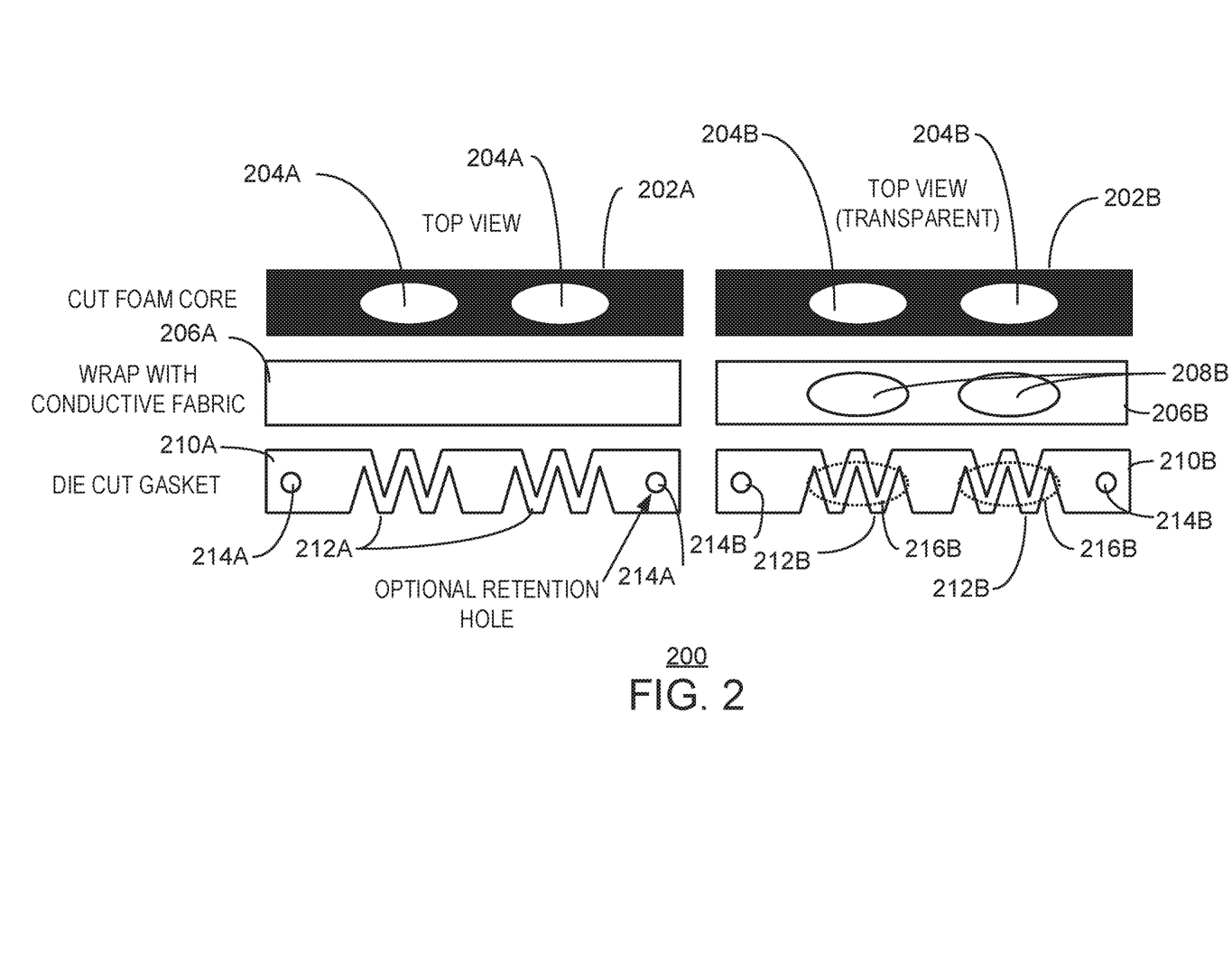
FIG. 2 is a diagram illustrating various views of a die-cut gasket during the manufacturing process.

FIG. 2 is a diagram illustrating various views of a die-cut gasket during the manufacturing process. The top view of the cut foam core 202A illustrates a foam material with a geometric shape cut in two locations. In the example of FIG. 2, two oval shaped holes 204A are cut in the foam core 202A. In some embodiments, any suitable shape or pattern can be cut into the foam core 202A. For example, the holes 204A in the foam core 202A can be based on triangles, squares, rectangles, hexagons, trapezoids, rhombuses, or any other suitable geometric shape or pattern. In some embodiments, any suitable number of holes based on geometric shapes can be cut into the foam core 202A. In some examples, each hole 204A cut into the foam core 202A can be based on a different geometric shape.

The top transparent view illustrates various materials incorporated into a die-cut gasket. Accordingly, the top transparent view of the cut foam core 202B illustrates the foam core 202B with holes 204B based on geometric shapes. Other materials are not illustrated in the top transparent view of the cut foam core 202B because other materials may not be attached to the cut foam core 202B until a later stage of manufacturing.

The top view of the conductive material wrapped gasket 206A illustrates the cut foam core 202A wrapped in any suitable conductive material. The conductive material can include any conductive fabric, foil, and the like. The top transparent view of the conductive material wrapped gasket 206B illustrates the cut foam core 202B wrapped in a conductive material to form the conductive material wrapped gasket 206B. The lighter shading 208B of the conductive material wrapped gasket 204B indicates areas where the foam core has been cut so that the conductive material covers a hollow space.

The top view of the die-cut gasket 210A illustrates the conductive material wrapped gasket 206A with a pattern 212A removed from areas corresponding to the holes 204A previously cut from the cut foam core 202A. For example, the die-cut gasket 210A illustrates a triangular pattern 212A removed from areas of the conductive material wrapped gasket 206A corresponding to the two oval holes 204A cut from the foam core 202A. In some examples, retention holes 214A can also be cut from the conductive material wrapped gasket 206A. The retention holes 214A can enable the die-cut gasket 210A to be stretched along an edge of an electrical component. The top view of the die-cut gasket 210A illustrates the die-cut gasket in an un-stretched state.

The top transparent view of the die-cut gasket 210B illustrates the die-cut gasket 206B with a triangular pattern 2128 removed from areas corresponding to the holes 204B previously cut from the cut foam core 202B. The die-cut gasket 210B also has retention holes 214B that enable the die-cut gasket 210B to remain in a stretched state. Additionally, lighter shading indicating areas 216B with conductive material surrounding hollow space. For example, the lighter shading can indicate areas 216B corresponding to the oval cut holes 204B from the foam core 202B that were wrapped with conductive material.

In some embodiments, the die-cut gasket 210A and 210B can include any suitable number of holes and patterns removed from a foam core. Additionally, the die-cut gasket 210A and 210B can include any suitable number of retention holes, among other features.

Figure 3:
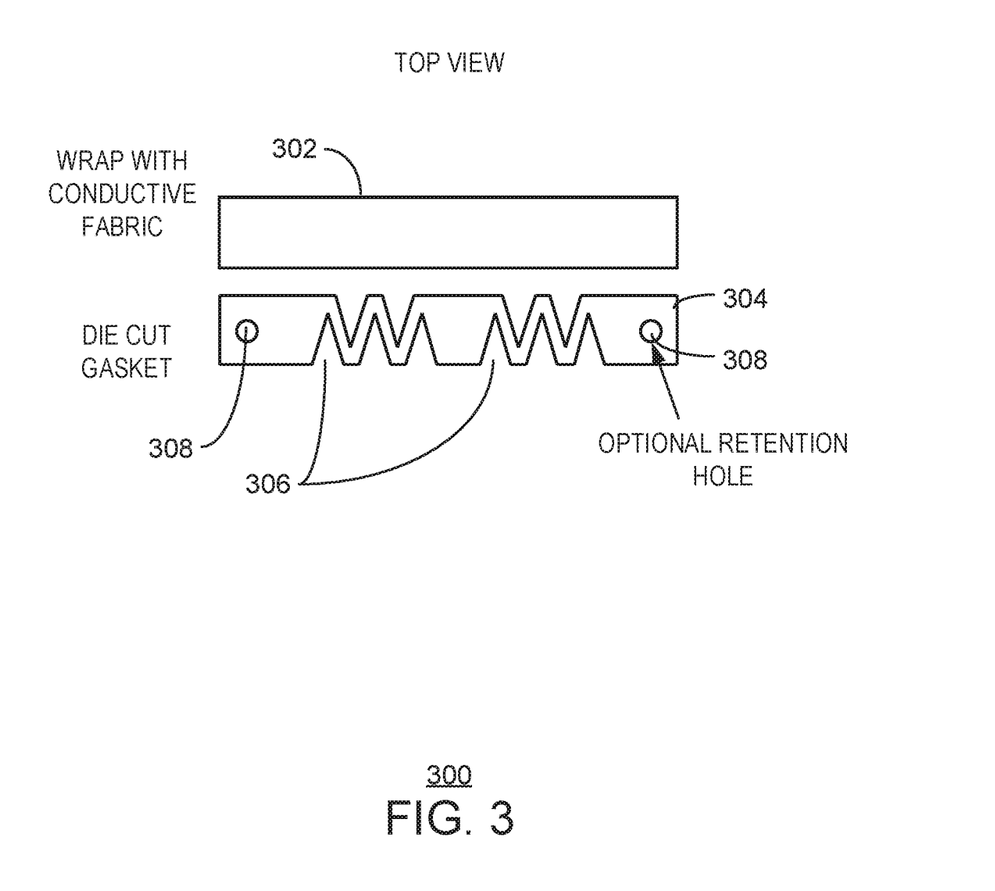
FIG. 3 is a diagram illustrating various views of a die-cut gasket comprised of conductive foam during the manufacturing process.

FIG. 3 is a diagram illustrating various views of a die-cut gasket comprised of conductive foam during the manufacturing process. The top view of the conductive foam core 302 illustrates a conductive foam core 302 that does not need to be wrapped in any suitable conductive material. The conductive foam core 302 can include any suitable conductive material that can prevent electromagnetic interference.

The top view of the die-cut gasket 304 illustrates the conductive foam core 302 with a pattern removed from any suitable number of areas. For example, the die-cut gasket 304 illustrates a triangular pattern 306 removed from areas of the conductive foam core. In some examples, the triangular pattern 306 can be removed from any suitable number of areas of the conductive foam core 302. The triangular pattern 306 can be removed in symmetric or asymmetric locations of the conductive foam core 302. In some embodiments, the triangular pattern 306 is removed from the conductive foam core 302 based on analysis of electromagnetic interference propagating within an enclosure of an electronic device. For example, the triangular pattern 306 can be cut from the conductive foam core 302 in areas of the conductive foam core 302 that can be stretched and protect against electromagnetic interference. In some embodiments, the triangular pattern 306 is cut from the conductive foam core 302 at locations of the stretched die-cut gasket 304 that is expected to experience electromagnetic interference below a threshold value.

In some examples, retention holes 308 can also be cut from the conductive foam core 302. The retention holes 308 can enable the die-cut gasket 304 to be stretched along an edge of an electrical component. In FIG. 3, the die-cut gasket 304 is illustrated in an un-stretched state. The die-cut gasket 304 in a stretched state is described below in relation to FIG. 4.

In some embodiments, the die-cut gasket 304 can include any suitable number of patterns removed from a conductive foam core. Additionally, the die-cut gasket 304 can include any suitable number of retention holes, among other features.

Figure 4:
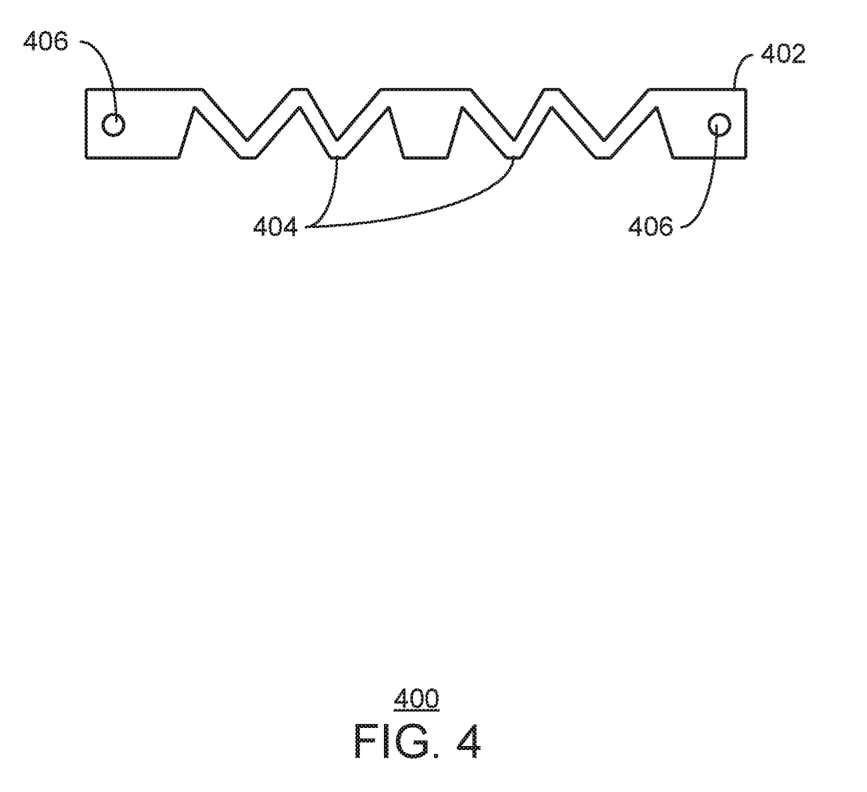
FIG. 4 is an example illustration of a top-view perspective of a stretched die-cut gasket.

FIG. 4 illustrates a die-cut gasket in a stretched state. For example, the die-cut gasket 402 in a stretched state can stretch or expand along portions of the die-cut gasket 402 in which a pattern has been cut. In the example die-cut gasket 402, a triangle pattern 404 has been cut into areas of the die-cut gasket that previously had oval holes cut from the foam core of the die-cut gasket 402. The remaining conductive material between the triangular pattern 404 allows the die-cut gasket 402 to be stretched. For example, the retention holes 406 can attach to hooking features of an enclosure to maintain the die-cut gasket 402 in a stretched state. Accordingly, the die-cut gasket 402 can be used to fill gaps or openings of larger areas proximate electronic components mounted in enclosures of electronic devices.

Figure 5:
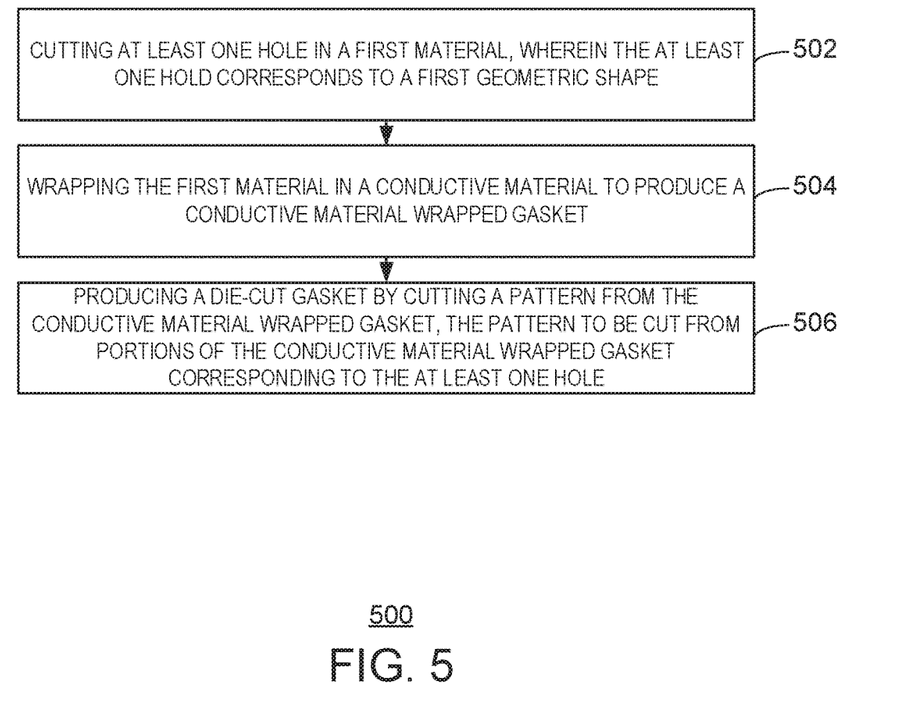
FIG. 5 is a process flow diagram of an example method for manufacturing a die-cut gasket.

FIG. 5 is a process flow diagram of an example method for manufacturing a die-cut gasket. The method 500 can be implemented with any suitable computing device, such as the computing system 702 of FIG. 7.

At block 502, the method 500 can include cutting at least one hole in a first material, wherein the at least one hole corresponds to a first geometric shape. As discussed above, the material can include any suitable non-conductive foam, plastic, rubber, or any other substrate for the die-cut gasket. In some examples, the geometric shape can include a circle, oval, triangle, square, rectangle, rhombus, trapezoid, hexagon, or any other suitable shape. In some embodiments, the geometric shape can be based on any suitable pattern. In some examples, the method 500 can include cutting one, two, three, or any other suitable number of holes in the material. In some embodiments, the holes can be different geometric shapes. The holes in the material can be located at any suitable point at which an amount of expected electromagnetic interference is below a predetermined threshold. For example, the method 500 can include determining a location of the die-cut gasket within an enclosure of an electronic device. The method 500 can also include detecting an amount of expected electromagnetic interference at the location of the gasket and determining a number of holes to cut in the material and a location of the holes. In some embodiments, the geometric shape of the holes of the material can be selected based on a combination of electromagnetic interference exposure of the gasket and a distance to stretch a gasket. The location of the holes can also be determined based in part on a width of the foam core or die-cut gasket. In some embodiments, a location of the at least one hole can be based in part on a frequency to be produced by a plurality of components in an electronic device enclosure, wherein the plurality of components are to be adjacent the die-cut gasket.

At block 504, the method 500 can include wrapping the first material in a conductive material to produce a conductive material wrapped gasket. In some examples, the conductive material can include any suitable conductive cloth, foil, and the like. The conductive material wrapped gasket can include a conductive material that wraps around the outer perimeter of the first material. In some embodiments, the conductive material is attached to the first material with any suitable adhesive. The conductive material wrapped gasket includes at least one hollow space in the first material corresponding to a location where the at least one hole was cut.

At block 506, the method 500 can include producing a die-cut gasket by cutting a pattern from the conductive material wrapped gasket, wherein the pattern can be cut from portions of the conductive material wrapped gasket corresponding to the at least one hole. In some examples, the pattern can be based on a second geometric shape. The second geometric shape can include a triangular shape, a circular shape, or any other suitable shape. The die-cut gasket can include segments of the first material wrapped in the conductive material which are connected by segments of conductive material without the first material. In some embodiments, the segments of conductive material without the first material can enable the die-cut gasket to stretch. In some embodiments, the method 500 can include inserting the die-cut gasket into an electronic device enclosure between an optical drive and a chassis.

In one embodiment, the process flow diagram of FIG. 5 is intended to indicate that the steps of the method 500 are to be executed in a particular order. Alternatively, in other embodiments, the steps of the method 500 can be executed in any suitable order and any suitable number of the steps of the method 500 can be included. Further, any number of additional steps may be included within the method 500, depending on the specific application. For example, the method 500 can also include cutting any suitable number of retention holes into the die-cut gasket. The retention holes can enable the die-cut gasket to stretch and remain in a stretched state as the die-cut gasket is inserted into an enclosure. For example, the retention holes can be placed or mounted onto hooking features such as pins or screws in the enclosure. In some embodiments, the die-cut gasket comprises a plurality of retention holes to couple the die-cut gasket in a stretched position to a chassis via a plurality of posts without an adhesive.

In some embodiments, the method 500 can also include manufacturing an enclosure with a channel that can house the die-cut gasket. For example, a channel in an enclosure proximate a die-cut gasket can enable the die-cut gasket to maintain its location in a stretched state. Accordingly, the method 500 can include inserting the die-cut gasket into an electronic device enclosure, wherein the electronic device enclosure comprises a plurality of pre-fabricated channels to couple the die-cut gasket to at least one metal surface of the electronic device enclosure.

Figure 6:
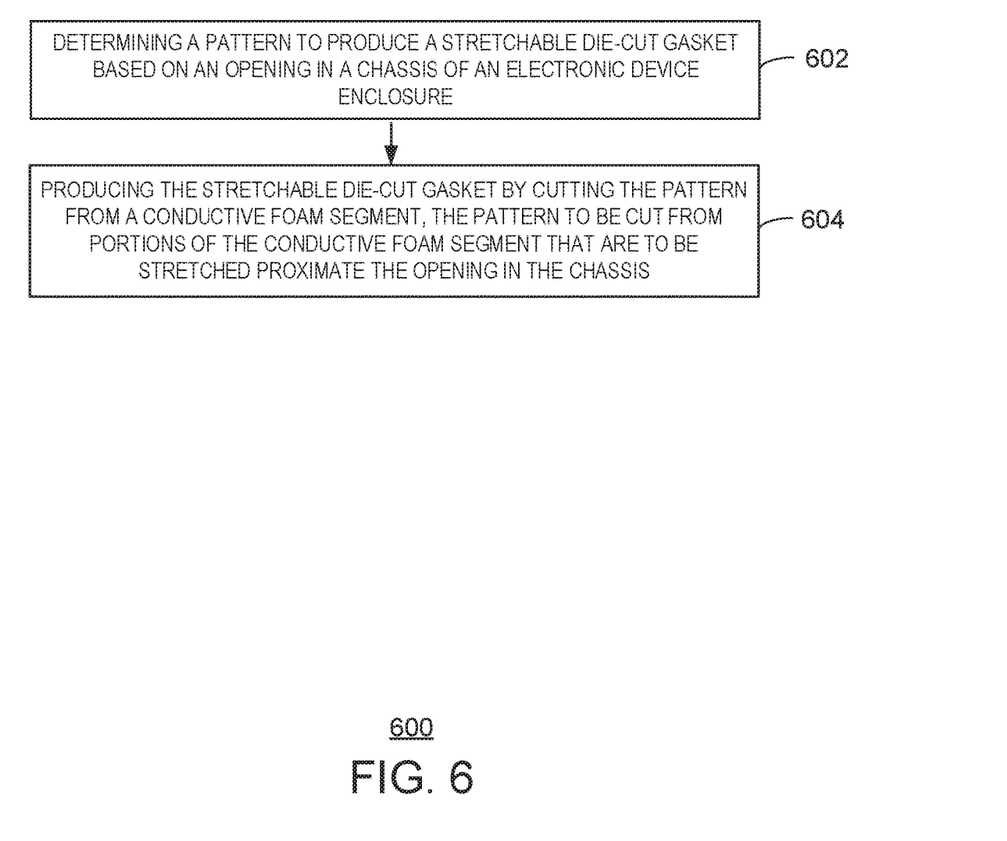
FIG. 6 is a process flow diagram of an example method for manufacturing a die-cut gasket from conductive foam.

FIG. 6 is a process flow diagram of an example method for manufacturing a die-cut gasket from conductive foam. The method 600 can be implemented with any suitable computing device, such as the computing system 702 of FIG. 7.

At block 602, the method 600 can include determining a pattern to produce a stretchable die-cut gasket based on an opening in a chassis of an electronic device enclosure. As discussed above, the die-cut gasket can use a conductive foam that may not include a conductive material wrapping. Accordingly, a pattern to produce a stretchable die-cut gasket can be cut from the conductive foam itself. In some embodiments, the pattern can be located at any suitable point at which an amount of expected electromagnetic interference is below a predetermined threshold. For example, the method 600 can include determining a location of the die-cut gasket within an enclosure of an electronic device. The method 600 can also include detecting an amount of expected electromagnetic interference at the location of the gasket and determining a number of areas of patterns to cut in the material and a location of the patterns. In some embodiments, the pattern to be cut from the conductive foam can be selected based on a combination of electromagnetic interference exposure of the gasket and a distance to stretch a gasket.

At block 604, the method 600 can include producing the stretchable die-cut gasket by cutting the pattern from a conductive foam segment, wherein the pattern can be cut from portions of the conductive foam segment that are to be stretched proximate the opening in the chassis. In some examples, the pattern can be based on a geometric shape. In some embodiments, the geometric shape can include a triangular shape, a circular shape, or any other suitable shape. The conductive foam can be stretched a predetermined distance based on the elasticity of the conductive foam. For example, a width of conductive foam remaining between areas cut from the pattern can enable more or less elasticity.

In one embodiment, the process flow diagram of FIG. 6 is intended to indicate that the steps of the method 600 are to be executed in a particular order. Alternatively, in other embodiments, the steps of the method 600 can be executed in any suitable order and any suitable number of the steps of the method 600 can be included. Further, any number of additional steps may be included within the method 600, depending on the specific application. For example, the method 600 can also include cutting any suitable number of retention holes into the die-cut gasket. The retention holes can enable the die-cut gasket to stretch and remain in a stretched state as the die-cut gasket is inserted into an enclosure. For example, the retention holes can be placed or mounted onto pins or screws in the enclosure.

FIG. 7 is a block diagram of an example of a computing system that can include a die-cut gasket. The example system 700 includes a computing device 702. The computing device 702 includes a processing unit 704, a system memory 706, and a system bus 708. In some examples, the computing device 702 can be a gaming console, a personal computer (PC), an accessory console, a gaming controller, among other computing devices. In some examples, the computing device 702 can be a node in a cloud network.

The system bus 708 couples system components including, but not limited to, the system memory 706 to the processing unit 704. The processing unit 704 can be any of various available processors. Dual microprocessors and other multiprocessor architectures also can be employed as the processing unit 704.

The system bus 708 can be any of several types of bus structure, including the memory bus or memory controller, a peripheral bus or external bus, and a local bus using any variety of available bus architectures known to those of ordinary skill in the art. The system memory 706 includes computer-readable storage media that includes volatile memory 710 and nonvolatile memory 712.

The basic input/output system (BIOS), containing the basic routines to transfer information between elements within the computer 702, such as during start-up, is stored in nonvolatile memory 712. By way of illustration, and not limitation, nonvolatile memory 712 can include read-only memory (ROM), programmable ROM (PROM), electrically programmable ROM (EPROM), electrically erasable programmable ROM (EEPROM), or flash memory.

Volatile memory 710 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 702 also includes other computer-readable media, such as removable/non-removable, volatile/nonvolatile computer storage media. FIG. 7 shows, for example a disk storage 714. Disk storage 714 includes, but is not limited to, devices like a magnetic disk drive, floppy disk drive, tape drive, Jaz drive, Zip drive, flash memory card, or memory stick.

In addition, disk storage 714 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 714 to the system bus 708, a removable or non-removable interface is typically used such as interface 716.

It is to be appreciated that FIG. 7 describes software that acts as an intermediary between users and the basic computer resources described in the suitable operating environment 700. Such software includes an operating system 718. Operating system 718, which can be stored on disk storage 714, acts to control and allocate resources of the computer 702.

System applications 720 take advantage of the management of resources by operating system 718 through program modules 722 and program data 724 stored either in system memory 706 or on disk storage 714. It is to be appreciated that the disclosed subject matter can be implemented with various operating systems or combinations of operating systems.

A user enters commands or information into the computer 702 through input devices 726. Input devices 726 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 726 connect to the processing unit 704 through the system bus 708 via interface ports 728. Interface ports 728 include, for example, a serial port, a parallel port, a game port, and a universal serial bus (USB).

Output devices 730 use some of the same type of ports as input devices 726. Thus, for example, a USB port may be used to provide input to the computer 702, and to output information from computer 702 to an output device 730.

Output adapter 732 is provided to illustrate that there are some output devices 730 like monitors, speakers, and printers, among other output devices 730, which are accessible via adapters. The output adapters 732 include, by way of illustration and not limitation, video and sound cards that provide a means of connection between the output device 730 and the system bus 708. It can be noted that other devices and systems of devices provide both input and output capabilities such as remote computing devices 734. The output devices 730 can also include any suitable fabrication device, such as a three dimensional printer, which can generate three dimensional objects based on fabrication instructions transmitted from the computer 702.

The computer 702 can be a server hosting various software applications in a networked environment using logical connections to one or more remote computers, such as remote computing devices 734. The remote computing devices 734 may be client systems configured with web browsers, PC applications, mobile phone applications, and the like. The remote computing devices 734 can be a personal computer, a server, a router, a network PC, a workstation, a microprocessor based appliance, a mobile phone, a peer device or other common network node and the like, and typically includes many or all of the elements described relative to the computer 702. In some embodiments, the remote computing devices 734 can also include any suitable fabrication device that can manufacture a three dimensional object such as a die-cut gasket described herein.

Remote computing devices 734 can be logically connected to the computer 702 through a network interface 736 and then connected via a communication connection 738, which may be wireless. Network interface 736 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 738 refers to the hardware/software employed to connect the network interface 736 to the bus 708. While communication connection 738 is shown for illustrative clarity inside computer 702, it can also be external to the computer 702. The hardware/software for connection to the network interface 736 may include, for exemplary purposes, internal and external technologies such as, mobile phone switches, modems including regular telephone grade modems, cable modems and DSL modems, ISDN adapters, and Ethernet cards.

The computer 702 can further include a radio 740. For example, the radio 740 can be a wireless local area network radio that may operate one or more wireless bands. For example, the radio 740 can operate on the industrial, scientific, and medical (ISM) radio band at 2.4 GHz or 5 GHz. In some examples, the radio 740 can operate on any suitable radio band at any radio frequency.

The computer 702 includes one or more modules 722, such as a die-cut gasket designer 742 and a die-cut gasket fabricator 744. In some embodiments, the die-cut gasket designer 742 can determine a number of holes to cut in a first material and a geometric shape for each of the holes. For example, the die-cut gasket designer 742 may analyze an enclosure and determine an amount of electromagnetic interference to be expected at an opening in which the die-cut gasket is to reside. The number of holes and the geometric shape of each hole can correspond to the electromagnetic interference to be expected at an opening. In some examples, the die-cut gasket designer 742 can determine not to cut a hole in response to detecting that the first material is a conductive foam.

In some embodiments, the die-cut gasket designer 742 can also determine a size of a conductive material to be wrapped around the first material if the first material is not a conductive foam. In some examples, the first material can be a hollow rubber material and the conductive material can be aluminum foil. The die-cut gasket designer 742 can also determine a pattern to be cut in the first material. In some embodiments, the die-cut gasket designer 742 can determine the pattern is based on a second geometric shape if the first material is not conductive foam. For example, as illustrated above in relation to FIG. 2, a second geometric shape can be used for a pattern to remove areas of a foam core proximate a previous hole cut using a different geometric shape. In some examples, the die-cut gasket designer 742 can determine that the pattern is to be based on any suitable geometric shape if the first material is a conductive foam. For example, as illustrated above in relation to FIG. 3, a conductive foam core may not have a first set of holes cut away. Accordingly, the die-cut gasket designer 742 can select any suitable geometric shape for the pattern to be cut from the gasket.

In some embodiments, the die-cut gasket fabricator 744 can transmit instructions to a fabrication device to cut at least one hole in a first material that is not conductive foam, wherein the at least one hole corresponds to a first geometric shape. The die-cut gasket fabricator 744 can also transmit instructions to a fabrication device to wrap the first material that is not conductive foam in a conductive material to produce a conductive material wrapped gasket. Additionally, the die-cut gasket fabricator 744 can produce a die-cut gasket by cutting a pattern from the conductive material wrapped gasket, the pattern to be cut from portions of the conductive material wrapped gasket corresponding to the at least one hole, wherein the pattern is to be based on a second geometric shape. In some examples, the first geometric shape and the second geometric shape are different shapes or different sizes.

In some embodiments, the die-cut gasket fabricator 744 can transmit instructions to a fabrication device to produce a stretchable die-cut gasket by cutting a pattern from a conductive foam segment, wherein the pattern is cut from portions of the conductive foam segment that are to be stretched proximate an opening in an electronic device chassis. In some embodiments, the pattern can be based on any suitable geometric shape.

It is to be understood that the block diagram of FIG. 7 is not intended to indicate that the computing system 702 is to include all of the components shown in FIG. 7. Rather, the computing system 702 can include fewer or additional components not illustrated in FIG. 7 (e.g., additional applications, additional modules, additional memory devices, additional network interfaces, etc.). In some examples, the interface ports 728 or output adapters 732, among others, can be separated from a chassis of the computing system 702 by a die-cut gasket. The die-cut gasket can prevent electromagnetic interference from the radio 740 and other components. Furthermore, any of the functionalities of the die-cut gasket designer 742, and the die-cut gasket fabricator 744 may be partially, or entirely, implemented in hardware and/or in the processor 704. For example, the functionality may be implemented with an application specific integrated circuit, in logic implemented in the processor 704, or in any other device.

Example 1

In yet another embodiment described herein, an electronic device includes an enclosure comprising an electronic component separated from a chassis of the enclosure by a die-cut gasket. The die-cut gasket can include at least one hole cut in a first material, wherein the at least one hole corresponds to a first geometric shape. Additionally, the die-cut gasket can include a conductive material wrapped around the first material and a pattern cut from the conductive material and the first material, the pattern to be cut from portions corresponding to the at least one hole, wherein the pattern is to be based on a second geometric shape.

Alternatively, or in addition, the first material can include a non-conductive foam. Alternatively, or in addition, the first geometric shape can be an oval. Alternatively, or in addition, the second geometric shape can be a triangle. Alternatively, or in addition, a location of the at least one hole can be based in part on a width of the die-cut gasket. Alternatively, or in addition, a location of the at least one hole can be based in part on a frequency to be produced by a plurality of components in the enclosure, wherein the plurality of components are to be adjacent the die-cut gasket. Alternatively, or in addition, the die-cut gasket can include a plurality of retention holes to couple the die-cut gasket in a stretched position to the chassis via a plurality of posts without an adhesive. Alternatively, or in addition, the enclosure can include a plurality of pre-fabricated channels to couple the die-cut gasket to at least one metal surface of the enclosure. Alternatively, or in addition, the electronic component can include an optical drive. Alternatively, or in addition, the first material can include a hollow rubber material and the conductive material can include aluminum foil.

Example 2

In one example, an electronic device can include an enclosure comprising an electronic component separated from a chassis of the enclosure by a die-cut gasket. The die-cut gasket can include a pattern cut from a conductive foam segment, the pattern to be cut from portions of the conductive foam segment that are to be stretched proximate an opening in the chassis, wherein the pattern is to be based on a geometric shape.

Alternatively, or in addition, the geometric shape comprises a triangle. Alternatively, or in addition, the die-cut gasket can include a conductive foam. Alternatively, or in addition, the die-cut gasket comprises a plurality of retention holes to couple the die-cut gasket in a stretched position to the chassis via a plurality of posts without an adhesive. Alternatively, or in addition, the enclosure comprises a plurality of pre-fabricated channels to couple the die-cut gasket to at least one metal surface of the enclosure. Alternatively, or in addition, the electronic component can be an optical drive.

Example 3

In one example, a method for manufacturing gaskets includes cutting at least one hole in a first material, wherein the at least one hole corresponds to a first geometric shape. The method can also include wrapping the first material in a conductive material to produce a conductive material wrapped gasket and producing a die-cut gasket by cutting a pattern from the conductive material wrapped gasket, the pattern to be cut from portions of the conductive material wrapped gasket corresponding to the at least one hole, wherein the pattern is to be based on a second geometric shape.

Alternatively, or in addition, the first material can include a non-conductive foam. Alternatively, or in addition, the first geometric shape can be an oval. Alternatively, or in addition, the second geometric shape can be a triangle. Alternatively, or in addition, the method can include determining a location of the at least one hole based in part on a width of the die-cut gasket. Alternatively, or in addition, the method can include determining a location of the at least one hole based in part on a frequency to be produced by a plurality of components in an electronic device enclosure, wherein the plurality of components are to be adjacent the die-cut gasket. Alternatively, or in addition, the die-cut gasket can include a plurality of retention holes to couple the die-cut gasket in a stretched position to a chassis via a plurality of posts without an adhesive. Alternatively, or in addition, the method can include inserting the die-cut gasket into an electronic device enclosure, wherein the electronic device enclosure comprises a plurality of pre-fabricated channels to couple the die-cut gasket to at least one metal surface of the electronic device enclosure. Alternatively, or in addition, the method can include inserting the die-cut gasket into an electronic device enclosure between an optical drive and a chassis. Alternatively, or in addition, the first material can include a hollow rubber material and the conductive material can include aluminum foil.

Example 4

In another embodiment described herein, a method for manufacturing gaskets includes determining a pattern to produce a stretchable die-cut gasket based on an opening in a chassis of an electronic device enclosure. The method can also include producing the stretchable die-cut gasket by cutting the pattern from a conductive foam segment, the pattern to be cut from portions of the conductive foam segment that are to be stretched proximate the opening in the chassis, wherein the pattern is to be based on a geometric shape.

Alternatively, or in addition, the geometric shape comprises a triangle. Alternatively, or in addition, the stretchable die-cut gasket comprises a conductive foam. Alternatively, or in addition, the die-cut gasket comprises a plurality of retention holes to couple the die-cut gasket in a stretched position to a chassis via a plurality of posts without an adhesive. Alternatively, or in addition, the method includes inserting the die-cut gasket into an electronic device enclosure, wherein the electronic device enclosure comprises a plurality of pre-fabricated channels to couple the die-cut gasket to at least one metal surface of the electronic device enclosure. Alternatively, or in addition, the method includes inserting the die-cut gasket into an electronic device enclosure between an optical drive and a chassis.

Example 5

In one example, a die-cut gasket can include at least one hole cut in a first material, wherein the at least one hole corresponds to a first geometric shape. The die-cut gasket can also include a conductive material wrapped around the first material and a pattern cut from the conductive material and the first material, the pattern to be cut from portions corresponding to the at least one hole, wherein the pattern is to be based on a second geometric shape.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. An electronic device, comprising:
an enclosure, comprising:
an electronic component separated from a chassis of the enclosure by a die-cut gasket,
wherein the die-cut gasket comprises:
at least one hole cut in a first material, wherein the at least one hole corresponds to a first geometric shape;
a conductive material wrapped around the first material; and
a pattern cut from the conductive material and the first material, the pattern cut from portions corresponding to the at least one hole, wherein the pattern is based on a second geometric shape, and wherein the pattern cut from the conductive material enables the die-cut gasket to transition to a stretched state.

2. The electronic device of claim 1, wherein the first material comprises a non-conductive foam.

3. The electronic device of claim 1, wherein the first geometric shape is an oval.

4. The electronic device of claim 3, wherein the second geometric shape is a triangle.

5. The electronic device of claim 1, wherein a location of the at least one hole is based in part on a width of the die-cut gasket.

6. The electronic device of claim 1, wherein a location of the at least one hole is based in part on a frequency to be produced by a plurality of components in the enclosure, wherein the plurality of components are to be adjacent the die-cut gasket.

7. The electronic device of claim 1, wherein the die-cut gasket comprises a plurality of retention holes to couple the die-cut gasket in the stretched state to the chassis via a plurality of posts without an adhesive.

8. The electronic device of claim 1, wherein the enclosure comprises a plurality of pre-fabricated channels to couple the die-cut gasket to at least one metal surface of the enclosure.

9. The electronic device of claim 1, wherein the electronic component comprises an optical drive.

10. The electronic device of claim 1, wherein the first material comprises a hollow rubber material and the conductive material comprises aluminum foil.

11. An electronic device, comprising:
an enclosure, comprising:
an electronic component separated from a chassis of the enclosure by a die-cut gasket,
wherein the die-cut gasket comprises:
a pattern cut from a conductive foam segment, the pattern cut from portions of the conductive foam segment that are stretched proximate an opening in the chassis, wherein the pattern is based on a geometric shape, and wherein the pattern cut from the conductive foam segment enables the die-cut gasket to transition to a stretched state.

12. The electronic device of claim 11, wherein the geometric shape comprises a triangle.

13. The electronic device of claim 11, wherein the die-cut gasket comprises a conductive foam.

14. The electronic device of claim 11, wherein the die-cut gasket comprises a plurality of retention holes to couple the die-cut gasket in the stretched state to the chassis via a plurality of posts without an adhesive.

15. The electronic device of claim 11, wherein the enclosure comprises a plurality of pre-fabricated channels to couple the die-cut gasket to at least one metal surface of the enclosure.

16. The electronic device of claim 11, wherein the electronic component comprises an optical drive.

17. A die-cut gasket, comprising:
at least one hole cut in a first material, wherein the at least one hole corresponds to a first geometric shape;
a conductive material wrapped around the first material; and
a pattern cut from the conductive material and the first material, the pattern cut from portions corresponding to the at least one hole, wherein the pattern is based on a second geometric shape, and wherein the pattern cut from the conductive material enables the die-cut gasket to transition to a stretched state.

* * * * *